July 4, 1944. H. H. HAGLUND ET AL 2,352,952
CODE CONVERTER
Filed Dec. 14, 1940    5 Sheets-Sheet 3
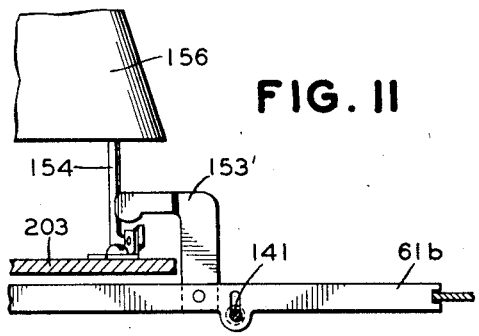
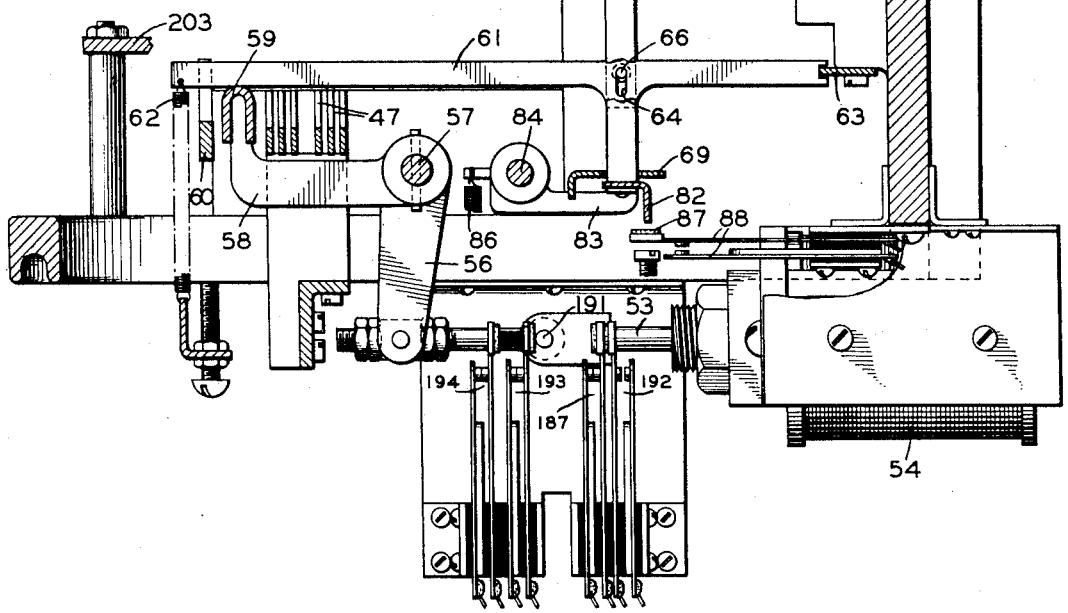
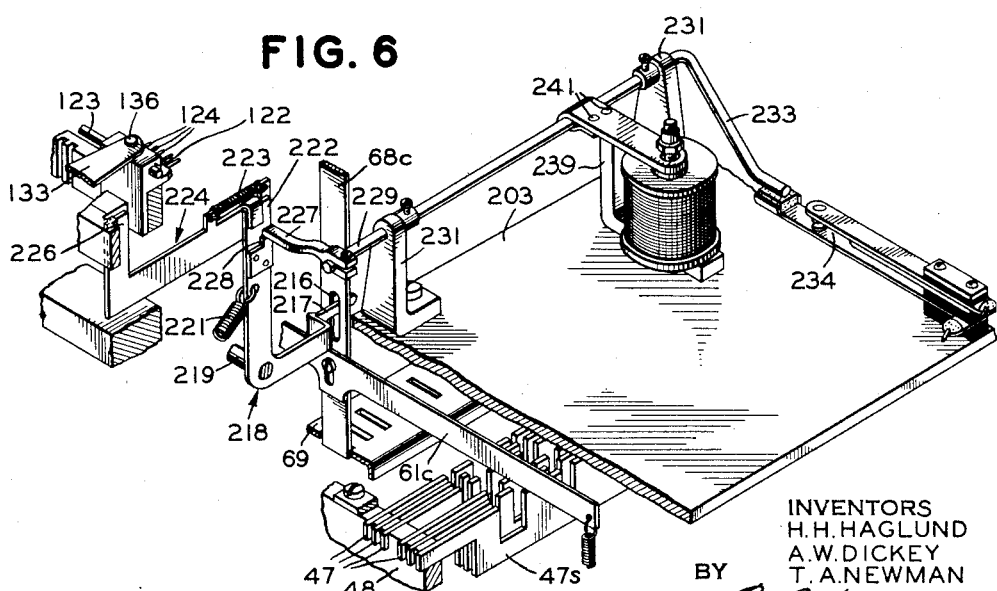
INVENTORS
H. H. HAGLUND
A. W. DICKEY
T. A. NEWMAN
BY
ATTORNEY July 4, 1944.  H. H. HAGLUND ET AL  2,352,952
CODE CONVERTER
Filed Dec. 14, 1940  5 Sheets-Sheet 4
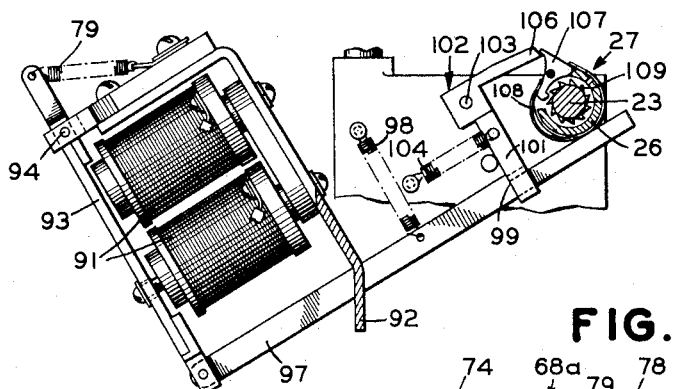
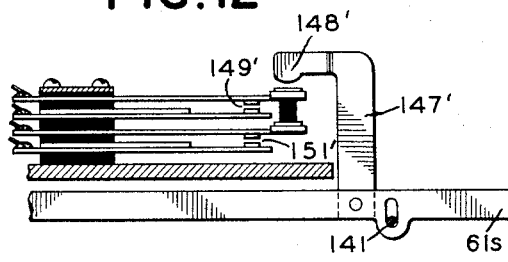
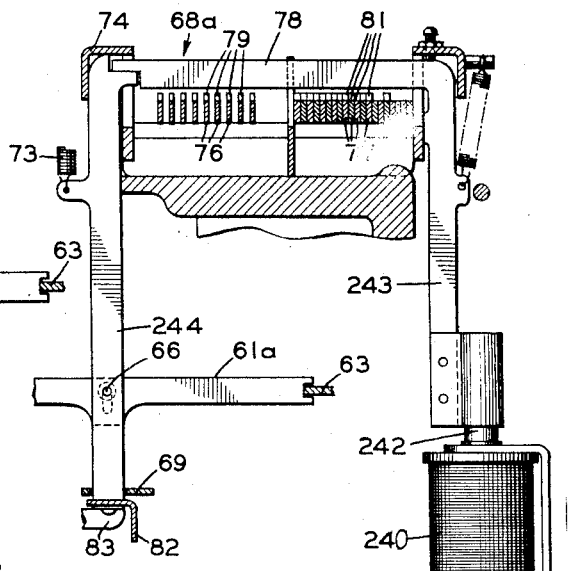
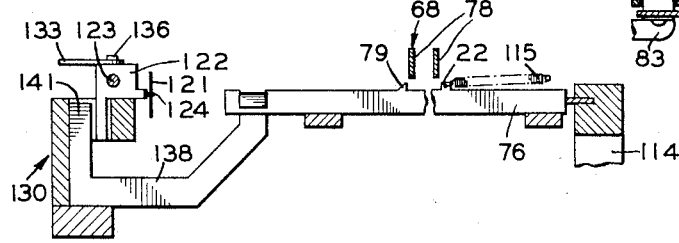
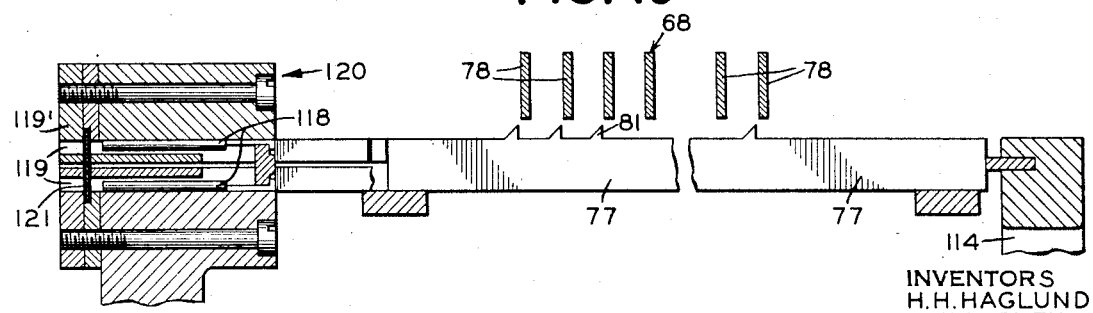
INVENTORS
H. H. HAGLUND
A. W. DICKEY
T. A. NEWMAN
BY M. R. Marsh
ATTORNEY

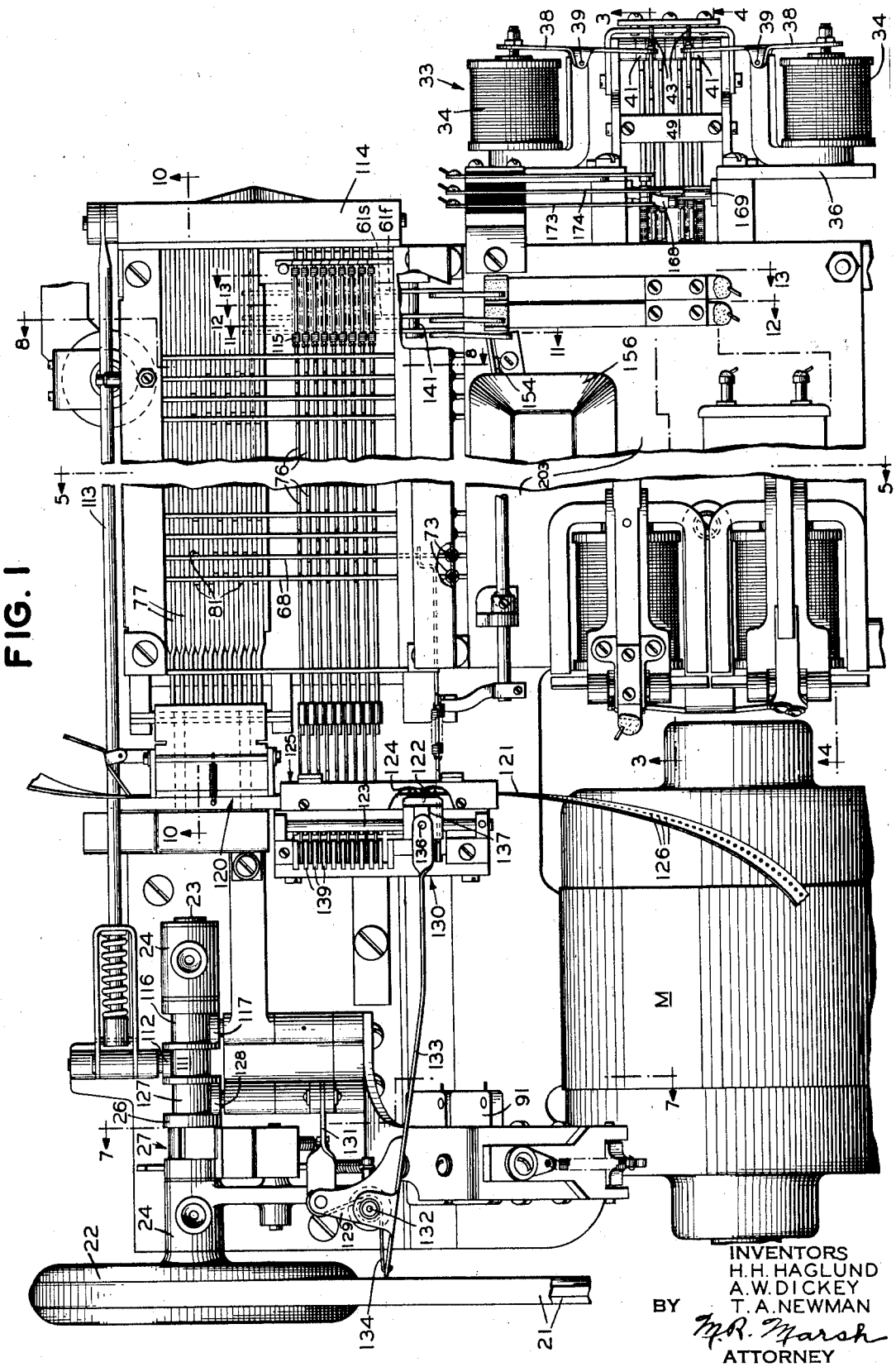

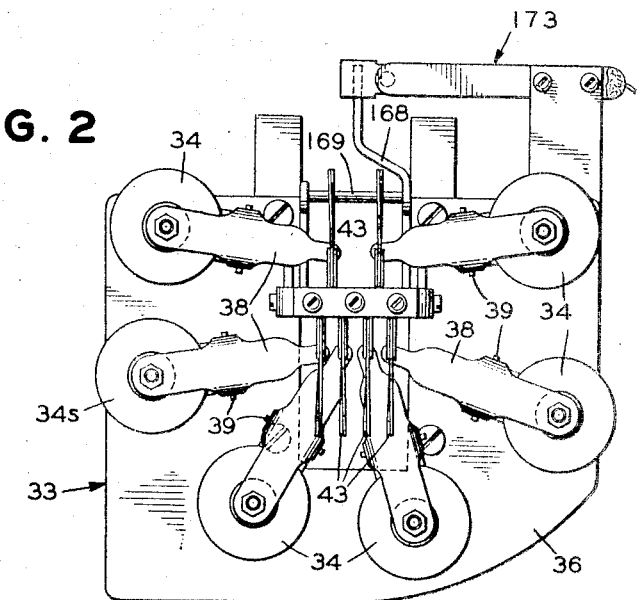
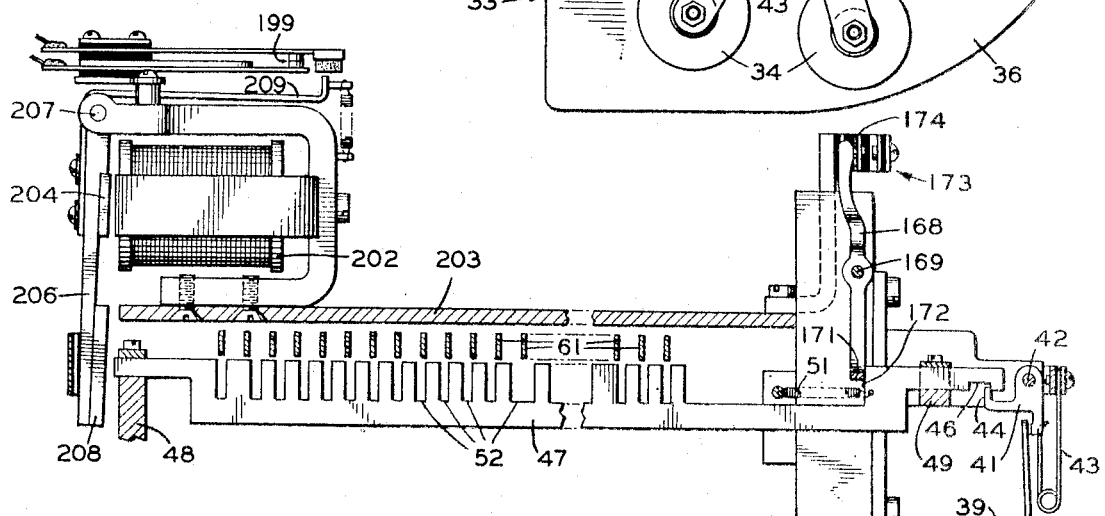
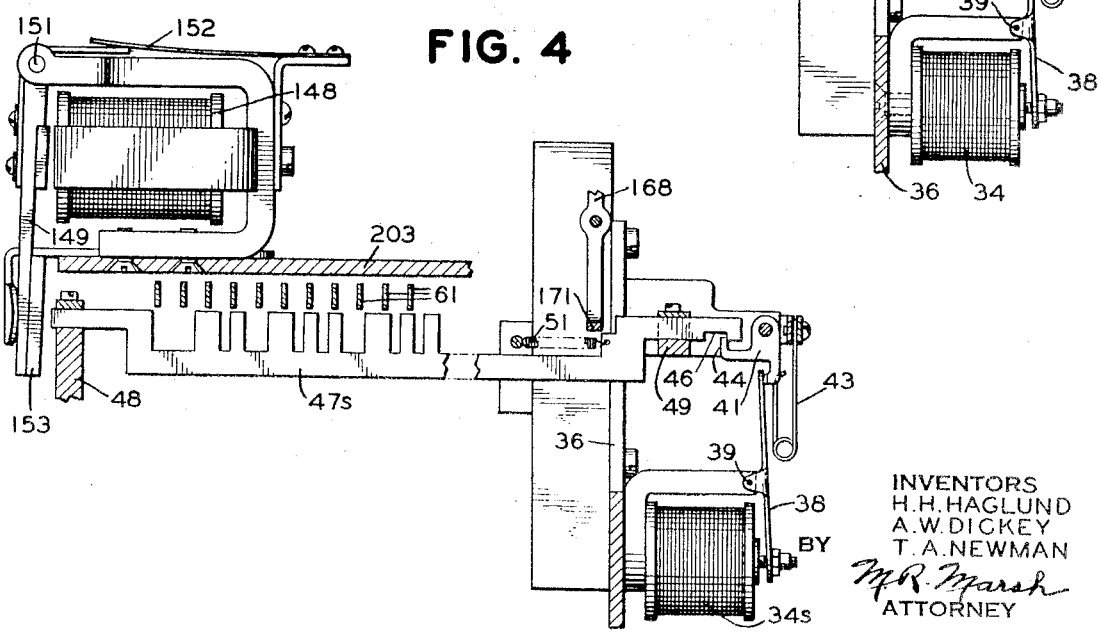

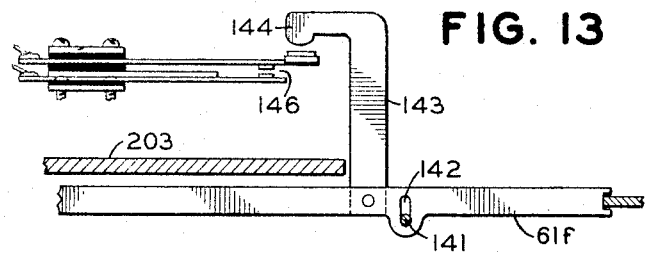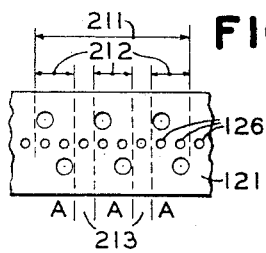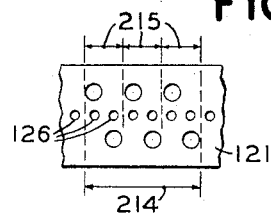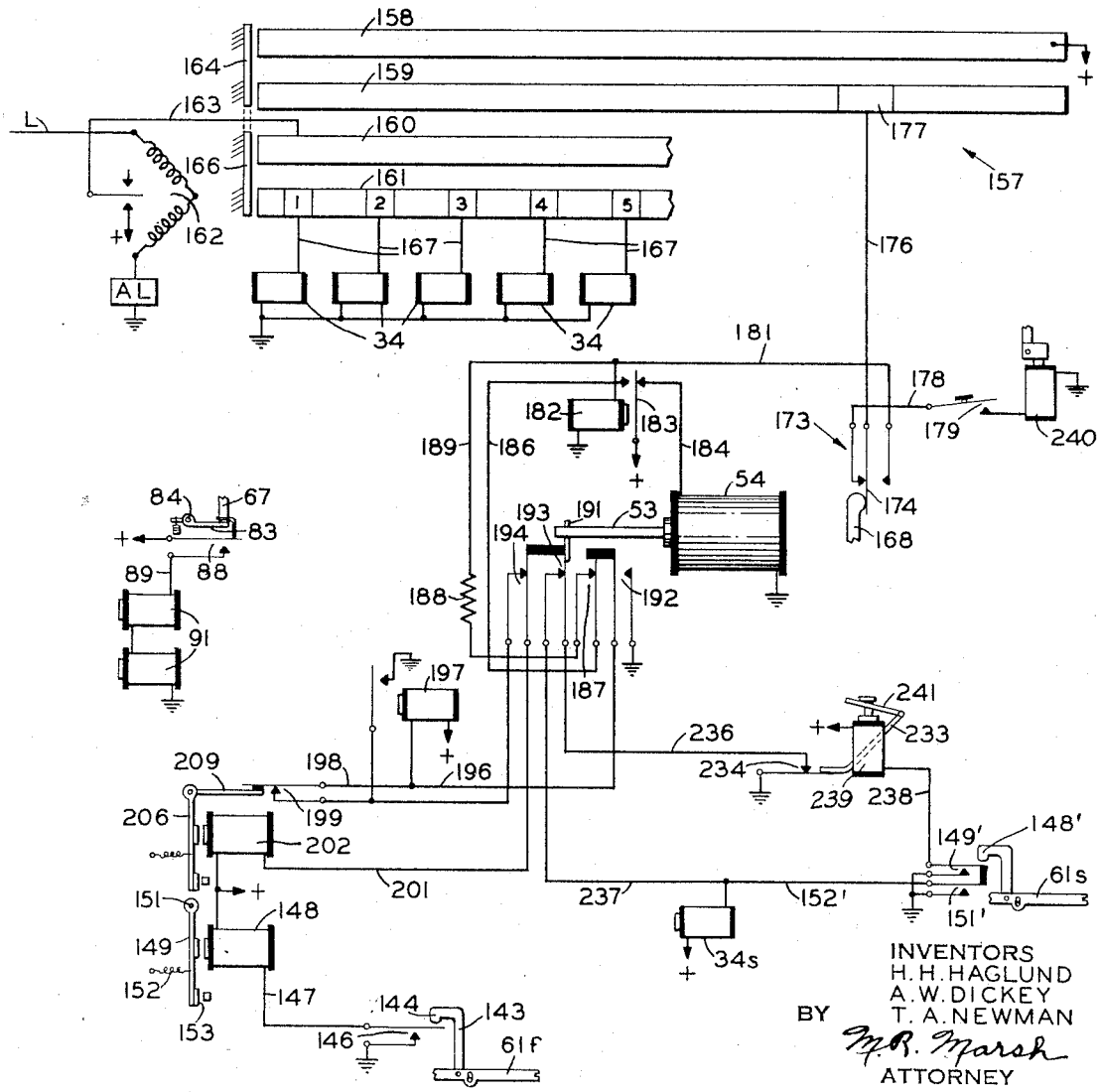

Patented July 4, 1944

2,352,952

UNITED STATES PATENT OFFICE 2,352,952

CODE CONVERTER

Hakon H. Haglund, New York, N. Y., Albert W. Dickey, Madison, N. J., and Thomas A. Newman, Rego Park, N. Y., assignors to The Western Union Telegraph Company, New York, N. Y., a corporation of New York Application December 14, 1940, Serial No. 370,098

12 Claims. (Cl. 178—92)

This invention relates primarily to a code converter for telegraph signals and more particularly to an arrangement for converting telegraph signals of one type, such as the two-current five-unit permutation Baudot type, into representative signals of another type, such as the variable length three-current Wheatstone-Morse or cable code type of signals.

It is the general practice in land line telegraphy to employ a fixed-unit permutation signalling code where each character is represented by a definite number of intelligence impulses composed of two line conditions. In some land line systems the two line conditions are negative and positive, and in others, current and no-current intervals. In the transmission of signals over submarine cables, it is sometimes advantageous to employ a three-current cable code wherein the characters are represented by various length signals composed of three line conditions, such as positive current, negative current and no-current intervals. Obviously, where it is desired to retransmit from one type of circuit to the other a conversion of the signals from one code to the other is required. Heretofore, in retransmitting intelligence received over a land line circuit to a cable circuit, it has been the general practice to record the signals received over the land line by some means such as a printer and thereafter manually perforate a tape to represent the received signals in accordance with the cable code which is then used to control a cable code transmitter for transmitting the converted signals over the cable. Such an arrangement requires one or more operators and, in addition, the likelihood of operator's errors occurring at the transition point is always present.

In view of the above, it is one of the primary objects of the present invention to provide a mechanism operating in response to and under the control of one type of signals to perforate a tape to represent a second type of signals.

It is a more specific object of the invention to provide an apparatus operating in response to and under the control of fixed unit two-current permutation type of signals to perforate a tape representing three-current code or Wheatstone-Morse signals.

Another object of the invention is to provide means for automatically and remotely controlling a perforator for perforating a tape with cable code characters.

In transmitting cable code signals of the Wheatstone-Morse type, each complete character is separated from each of the others by an interval of no-current. The no-current interval is represented in the perforated tape by a blank section or by the absence of a perforation in either the marking or spacing section of the tape. Such a section of the tape has only a feed hole therein, and on the passage of a section of tape with only a feed hole therein through the associated transmitter, an interval of no-current is transmitted to the cable. In ordinary operation of the cable code perforator the blank section of the tape is normally automatically perforated between each character. However, some of the less frequently used so-called combination characters in the cable code are represented by signals of two or more characters without the no-current interval or intervals separating the characters. Accordingly, when it is desired to perforate the tape to represent a signal which may be made up of two or more characters, the normal spacing of the tape one feed hole is not effected between characters comprising the composite character.

It is, therefore, another object of the invention to provide means for controlling the operation of the perforator whereby two or more successively perforated characters represent one composite or combination character.

These and other more specific objects of the invention will appear hereinafter in connection with the detailed description thereof.

The preferred embodiment of the invention utilizes some of the mechanisms and elements of a keyboard controlled cable perforator of the type such as that disclosed in a patent to F. G. Creed, No. 1,579,087, issued March 30, 1926. The above identified perforator comprises a set of manually operable key levers which on the operation thereof effect the perforation of a tape adapted to subsequently control a transmitting device to transmit signals of the three-current or Wheatstone-Morse type representative of the actuated key levers. While some of the original elements of the keyboard controlled cable code perforator, such as the key levers, are removed and replaced by other mechanisms so as to enable the operation of the perforator in accordance with the principles of the invention or to control the same in response to the receipt of permutation type of signals, the main perforating mechanisms are retained.

The tape prepared by the perforator is of comparatively narrow width with a row of feed holes along the center thereof, which are utilized in feeding the tape through the perforator and an associated transmitter. The operation of the perforator so as to perforate a hole in the tape on one side of the feed hole enables the tape to subsequently control the operation of a transmitter through which the tape may be fed to transmit a signal interval of one line condition, such as positive. A perforation in the tape on the opposite side of the center hole effects the operation of the transmitting device as the tape subsequently feeds therethrough to transmit a second line condition, such as a negative impulse, which is of opposite polarity to the impulse transmitted in conjunction with a perforation on the other side of the feed hole. The holes are perforated in various combinations on the two sides of the feed holes to represent the characters, and each complete character perforated in the tape is separated by the presence of a so-called blank section or a section with only a feed hole. The passage of the section of the tape containing only a feed hole through the transmitter controls the transmitter to transmit an interval of no current.

The perforating mechanism in the above mentioned patent in general comprises a punch block which suitably guides the tape, and a set of punches with a cooperating die plate. The punch block is moved at the required times toward and from a series of specially notched so-called combination bars that are properly conditioned in accordance with each received signal to perforate the tape to represent the received signal. After each punching operation the tape is moved forward by a tape feeding device to a definite position so as to bring a succeeding portion thereof into position to be punched to represent a succeeding received signal. Where various lengths of the tape are perforated or punched to represent variable length signals, such as in the Wheatstone-Morse system of telegraphy, the tape feeding device necessarily has to advance the tape varying amounts for each operation of the perforator. The tape feeding device comprises a feed rake or rack which concomitantly with each punching operation is disengaged from the tape and idly moved backward to an extent corresponding to the length of the letter being punched in the tape. The backward movement of the feed rake is determined by one or another of a series of specially notched space and stop bars that are conditioned in conjunction with and by the signal responsive mechanism. Following the punching operation the feed rack reengages the feed holes of the punched tape and moves forward to a definite fixed position to bring a succeeding blank portion of the tape into operative relation with the punches where that portion of the tape may be punched in accordance with the next received signal.

For producing punched tape according to the Wheatstone-Morse system a group of notched bars which may number as many as twenty are employed with a like number of punches. The punches are adapted to perforate the tape on either one or the other side of the feed holes and, accordingly, half as many notched space bars are employed to control the advancement of the tape.

In accordance with the invention, the perforator is controlled by a set of signal responsive selector magnets which, in turn, control the position of a set of selector bars. The selector bars have various arrangements of notches therein, and following the positioning thereof in accordance with a received signal group a set of operating levers is brought into engagement with the selector bars, and the one opposite an aligned row of notches is allowed to enter therein and control the operation of various ones of the combination and space bars. The combination and space bars control the operation of the perforating mechanism, as hereinbefore pointed out. Following the selection of an operating lever, the same is returned to its normal position, and the selector bars reset to normal, where they are in position to be selectively operated in response to the next received signal group.

In the accompanying drawings which illustrate the preferred embodiment of the invention:

Fig. 1 is a plan view of the perforating mechanism, with certain sections thereof broken away, adapted to operate under the control of five-unit two-current permutation type signals to perforate a tape in accordance with the variable length three-current Wheatstone-Morse cable code;

Fig. 2 is a side elevational view of the signal responsive devices for selectively controlling the perforator;

Fig. 3 is a vertical sectional view taken substantially on line 3—3 of Fig. 1, showing a selector bar with its associated elements;

Fig. 4 is a vertical sectional view taken substantially on line 4—4 of Fig. 1, showing the case control selector bar and associated elements;

Fig. 5 is a vertical sectional view taken substantially on line 5—5 of Fig. 1, through the transverse center of the perforating mechanism;

Fig. 6 is a perspective view, showing the mechanism for controlling the perforator to perforate combination characters;

Fig. 7 is a vertical sectional view taken substantially on line 7—7 of Fig. 1, showing the clutch releasing elements;

Fig. 8 is a vertical sectional view taken substantially on line 8—8 of Fig. 1, showing the elements for controlling the feeding of blank tape through the perforator;

Fig. 9 is a vertical sectional view showing one of the sets of elements for controlling the tape feeding;

Fig. 10 is an enlarged vertical sectional view taken substantially on line 10—10 of Fig. 1, showing the punch block and punch pin arrangement;

Figs. 11, 12 and 13 are vertical sectional views taken on lines 11—11, 12—12, and 13—13, respectively, of Fig. 1, showing the various function controlling elements;

Figs. 14 and 15 are face views of sections of the tape perforated in accordance with the operation of the perforator; and Fig. 16 is a wiring diagram, showing the circuits and control elements of the perforator.

Referring first to Fig. 1, a constantly rotating motor M is adapted to furnish all the power for operating the perforating mechanism. A belt 21 transmits the power from the motor pulley (not shown) to a pulley 22 fixed to a shaft 23 for rotation therewith. The shaft 23 is journaled in bearings 24 and has loosely mounted thereon a sleeve 26. The sleeve 26 is coupled and uncoupled from the shaft 23 by a grab clutch, indicated in general by reference numeral 27, which is hereinafter described in more detail. The sleeve 26 has a seres of cams thereon which control and perform the various functions in timed relation to one another.

The selecting mechanism, indicated in general by reference numeral 33, comprises a set of signal responsive magnets such as 34, Figs. 1, 2 and 3, secured to a mounting plate 36 attached to the right hand side of the perforator. Also mounted on the plate 36 with the selecting magnets 34 is a case shift control magnet 34s adapted to operate in substantially the same manner as the selecting magnets, the operation of which will now be described. Associated with each one of the selecting magnets 34 are armature levers 38 which are pivoted at their centers on pins such as 39, and in operative relation with the free ends thereof are latches 41. The latches 41 are all pivoted on a common pivot 42, and associated with each one of the latches is an individual hairpin spring 43. The arrangement of one of the selector magnets 34 and its associated armature 38 and latch 41 is shown most clearly in Fig. 3, wherein the associated spring 43 tends to pivot the latch 41 in a clockwise direction and simultaneously maintains the armature lever 38 in its unoperated position. The latch 41, Fig. 3, has an upwardly extending arm 44 adapted to cooperate with a notch 46 on the right hand end of an associated selector bar 47 to hold the associated selector bar in its normal unoperated right hand position. The selector bars 47, one associated with each selector magnet 34, are adapted for longitudinal movement, being guided adjacent the two ends in slotted guide blocks such as 48 and 49. Individual springs such as 51 attached to each of the selector bars 47 normally tend to slide the bars toward the left into their left hand or operated positions. However, the arms 44 of the latches 41 engaging the notches such as 46 normally prevent movement of the selector bars 47 towards the left by springs such as 51.

The selector magnets 34 are selectively energized in accordance with signal code groups received over circuits hereinafter described, and the selector bars 47 associated with the energized selector magnets 34 move to their left hand positions as the energized magnets operate associated latches 41. Each of the selector bars 47 has arranged on the upper side thereof a series of notches 52, the notches in each selector bar being arranged differently from that in each of the others. The notches 52 are so arranged that for each permuted setting of the selector bars 47 different rows of aligned notches appear therein, the aligned rows of notches controlling the selection of elements in a manner hereinafter described.

The case shift control magnet 34s is arranged substantially the same as the selector magnets 34 and has an armature 38, a latch 41, a spring 43, and a case shift control selector bar 47s. The case shift control selector bar 47s operates in substantially the same manner as the selector bars 47, the difference in its operation being pointed out in detail hereinafter. The case shift control bar determines whether one or the other of two characters will be perforated in the tape in response to a given signal code group.

Following the positioning of the selector bars 47, a solenoid 54 attached to the underside of the perforator is so energized as to move its associated plunger rod 53 to the right. The left hand end of the rod 53 is pivotally connected to the lower end of an arm 56, the upper end of which is attached to a rod 57. The rod 57 also has attached thereto leftwardly extending arms such as 58 which carry on upwardly extending fingers thereof a bail member 59. With the rod 53 in its normal left hand position, the bail member 59 engages the undersides of a series of operating levers 61 adjacent the left hand ends thereof to hold the same in a normal elevated position. The operating bars 61 in their normal position are substantially horizontal, with the right hand ends thereof bifurcated to engage a notched pivot plate 63. The notches in the plate 63 together with vertical slots in a comb plate 60 guide the operating levers 61 adjacent the two ends thereof. The operating bars 61 in their normal position clear the selector bars 47 by a slight amount and when the bail 59 moves downward in response to movement of the rod 53 to the right, individual springs 62 associated with each one of the operating levers 61 pivot the latter in a counterclockwise direction. As the bail 59 moves downward to allow the operating bars 61 to engage the selector bars 47, the operating bar opposite the aligned row of notches in the selector bars is allowed to pivot a considerable amount further than the other selector bars which are stopped in their downward pivoting on engagement with the sections of the selector bars between the notches. The thus selected operating bar 61 or the one which is permitted to pivot further than the rest by entering an aligned row of notches in the selector bars 47 and 47s selectively controls the perforating mechanism to perforate the tape in a manner representative of the received signals.

The operating levers 61 have adjacent the centers thereof vertical slots 64 which engage shoulder screws 66 adjacent the lower ends of arms 67 forming a part of associated so-called horizontal bars 68. The horizontal bars 68 are L-shaped and are guided for vertical movement by comb plates such as 69, 71 and 72. Each horizontal bar 68 has an associated spring 73 attached thereto and anchored in a plate 74 extending transversely of the perforator. The springs 73 hold the horizontal bars 68 in their upper or normal position with the screws 66 in the depending arms 67 thereof against the upper extremity of the slots 64 in associated operating bars 61.

Hereinbefore mentioned space bars 76 and combination bars 77 are located beneath the horizontal arms 78 of the horizontal bars 68 and at right angles thereto. The space bars 76 and the combination bar 77s are arranged for movement in the direction of their length by means hereinafter described, being guided for longitudinal movement by suitable guide means (not shown). As shown most clearly in Figs. 9 and 10, and fully described in the above-mentioned patent, the space bars 76 and combination bars 77 have extending from the upper sides thereof small projections or lugs 79 and 81, respectively, predeterminedly arranged so as to control the operation thereof, as hereinafter pointed out. With the horizontal bars 68 in their normal elevated positions as held by associated spring 73, the undersides of the horizontal arm 78 just clear the lugs 79 and 81 on the space and combination bars 76 and 77, respectively.

On the selection of one of the operating bars 61 by the entrance thereof into an aligned row of notches in the selector bars 47, in a manner hereinbefore pointed out, the said selected operating bar 61 pivots in a counterclockwise direction, as shown in Fig. 5. During this pivoting of the selected operating bar 61, the upper end of the slot 64 therein engaging the screw 66 in an associated horizontal bar 68 moves the associated horizontal bar downward. The strength of the spring 62 pivoting the selected operating bar 61 relative to the strength of the spring 73 tending to hold the horizontal bar in elevated position is such that the spring 62 predominates.

The selection of a horizontal bar 68 or the movement thereof from a normal elevated position down to a selected or operated position places the horizontal arm 78 thereof into operative relation with the lugs 79 and 81 on the space and combination bars 76 and 77 to control the perforating and tape advancing mechanism, as hereinafter pointed out. In operative relation with the lower ends of the depending arms 67 of the horizontal bars 68 is a trip bail 82. The trip bail 82 is supported on horizontal arms 83 which extend from a rod 84 and is normally held in its normal position by a spring 86. On the selection of a horizontal bar 68, the lower end of the arm 67 engages the bail 82 to pivot the same downward in a clockwise direction against the action of the spring 86. During the clockwise pivoting of the trip bail 82, it engages a piece of insulating material 87 on the upper element of a set of normally open contact springs 88 to effect closing of the contacts. The normally open contacts 88 are supported from the under side of the perforator and control the tripping of the clutch 27, Fig. 1. One of the springs or elements of the contact set 88 is connected to battery, as shown in Fig. 16, and the other is connected by a conductor 89 through the coils of a trip magnet 91, Figs. 1, 7 and 16, to ground. Thus, the closing of the contact elements 88 effects energization of the magnet 91.

The trip magnet 91, Fig. 7, is supported on a member 92 forming a part of the frame structure and has associated therewith an armature lever 93. The armature lever 92 is pivoted on a pin 94 and has a retractile spring 96 adapted to move the armature lever 93 to its retracted position when the magnet 91 is deenergized. Pivotally attached to the lower end of the armature lever 93 is a push bar 97. A spring 98 attached to the push bar 97 tends to pivot the push rod in a counterclockwise direction and normally holds a shoulder 99 adjacent the free end thereof in engagement with the depending arm 101 of a bell crank 102. The bell crank 102 is pivoted on a pin 103 and has a spring 104 attached thereto tending to pivot the same in a clockwise direction. In the normal position of the bell crank 102 a rightwardly extending arm 106 is normally engaged with or in the path of a dog 107 carried by the sleeve 26. On energization of the trip magnet 91, the push bar 97 pivots the bell crank 102 in a counterclockwise direction to withdraw the end of the arm 106 from engagement with the dog 107. Thereupon a spring 108 pivots the dog 107 to effect engagement of the hooked portion thereof with a ratchet 109 on the constantly rotating shaft 23. Thus, the energization of the trip magnet 91 effects release of the clutch 27, whereupon the latter rotates with the continuously rotating shaft 23. Following a revolution of the sleeve 26, the arm 106 of the bell crank 102 effects disengagement of the dog 107 from the ratch 109 and brings the sleeve 26 to rest in its normal rest position.

During the first part of the rotation of the sleeve 26, the center cam 111 thereon cooperates with a cam follower 112 to move a rod 113 to the right as shown in Fig. 1. The right hand end of the rod 113 is connected to a pivoted resetting plate 114 in operative relation with the right hand ends of the combination bars 77 and the space bars 76. The space bars 76 have individual springs 115, Figs. 1 and 9, attached thereto which tend to move the space bars to the right, and as the reset plate 114 moves to the right, those space bars 76 which are not prevented from moving to the right by means hereinafter pointed out, move with the reset plate. As pointed out in the preceding paragraphs, the selected horizontal bar 68 is in its lower or selected position prior to the release of the cam sleeve 26 and, accordingly, the said selected horizontal bar will be in the path of the lugs or projections 79 and 81 on some of the space and combination bars 76 and 77, respectively. Therefore, as the reset plate 114 moves to the right, the space bars 76 moving therewith bring one or more of the lugs 79 on the space bars into operative relation with the left hand side of the selected horizontal bar 68. Such engagement of one or more of the lugs 79 with the selected horizontal bar 68 blocks substantially all movement of one or more of the space bars to the right and the blocked and unblocked space bars control the operation of the tape feeding mechanism in a manner pointed out hereinafter.

Following the operation of the reset plate 114 to the right and during the interval that the reset plate is in its right hand position, a cam 116 on the sleeve 26 cooperates with a cam follower 117 to move the punch block 120 and a tape guideway 125 to the right. As shown in Fig. 10, the punch block 120 includes a set of horizontal punch pins 118, one for each of the combination bars 77 in operative relation with the left hand ends thereof. The left hand ends of the punch pins 118 are in alignment with holes such as 119 in a die plate 119'. The recording tape 121 is guided in the punch block 120 between the left hand ends of the punch pins 118 and the holes 119. With a horizontal bar in its selected position it is effective to block rightward movement of some of the combination bars 77 by means of lugs 81 engaging the left hand side of the selected horizontal bar. Accordingly, as the punch block 120 moves to the right some of the pins 118 therein are blocked by associated combination bars 77. The blocked punch pins 118 thereupon perforate the tape 121 while the punch pins which are not blocked move their associated combination bars 77 to the right and no holes are formed in the tape by the unblocked punch pins. The subsequent return of the punch block 120 to its normal left hand position effects the withdrawal of the blocked punch pins from out of the perforations in the tape and frees the same for advancement. The punch block 120 may also have a set of feed hole punch pins therein which are invariably blocked on or during rightward movement of the block which accordingly perforate feed holes such as 126, Figs. 14 and 15, in the tape.

Engagement of the lugs 79 and 81 of the space and combination bars 76 and 77 locks by friction the selected horizontal bar 68 in its selected or lower position and hence the selected operating bar 61 may be returned to its normal elevated position by virtue of the slot 64 therein without affecting the return of the selected horizontal bar 68 to its normal position. With such an arrangement the reset of the operating bars 61 may occur during the perforating operation and also the selector bars 47 may be set in a permuted setting representative of the succeeding signal group during the perforating operation. This arrangement of the overlap between the perforating and selecting operation enables the perforating and tape feeding operations of one signal to occur during the receipt of a following signal.

The tape feeding mechanism indicated in general in Figs. 1, 6 and 9, by reference numeral 130, comprises a feed rake 122 which is adapted to slide back and forth in a horizontal plane on a guide rod 123. Formed on the left hand side of the feed rake 122 are pins such as 124 adapted to engage the feed holes 126 in the tape to advance the same. During movement of the punch block 120 and the tape guideway 125 to the right, the tape 121 moves away from the feed rake 122 and withdraws the feed holes from out of engagement with the pins 124. While the tape guideway 125 is in its right hand position, a cam 127 on the sleeve 26 is operative on a cam follower 128 to pivot a bell crank 129 in a counter-clockwise direction as shown in Fig. 1 through instrumentalities including a link 131. The bell crank 129 is pivoted at 132 together with the left hand end of a flat leaf spring 133. A spring 134 normally tends to pivot the leaf spring 133 with the bell crank 129. The right hand end of the leaf spring 133 carries a pin 136 which engages a slot 137 in the feed rake 122. Accordingly, as the bell crank 129 pivots in a counter-clockwise direction, the leaf spring 133 pivoting therewith tends to slide the feed rake 122 toward the punch block 120. During such movement of the bell crank 129 the pins 124 of the feed rake 122 are out of engagement with the tape 121 as the tape guideway 125 is at this time in its right hand position and accordingly the tape does not move with the rake.

Each of the space bars 76 has associated and connected to the right hand ends thereof individual U-shaped member 138, Fig. 8. The U-shaped members 138 are guided in vertical slots 139 in the tape feeding unit 130 and are adapted for transverse movement with the space bars 76. Normally the upper end 141 of the left hand arm of U-shaped member 138 is out of the path of movement of the feed rake 122. However, as the space bars 76 move to the right with the reset plate 114 under the action of their individually associated springs 115, the upper ends of the left hand arms of the U-shaped members 138 move into the path of the feed rake 122. The space bars 76 are blocked in moving to their right hand position in accordance with the operation of the selected horizontal bar 68 and the U-shaped members 138 associated with the blocked space bars 76 do not move into operative relation with the feed rake 122. The lugs 79 on the space bars 76 are so arranged that the space bars are blocked accumulatively from the forwardmost one, that is, if two space bars are blocked it will be the first two, if three are blocked it will be the first three, and so forth. Accordingly, as the feed rake 122 moves along the rod 123 toward the punch block 120, it is blocked in this movement by the upper end 141 of the left hand arm of the U-shaped member 138 associated with the first one of the unblocked space bars 76. This blocking of the feed rake 122 prevent further movement thereof and while in its blocked position, the tape guideway 125 and punch block 120 return to their normal left hand position. The returning of the tape guideway 126 to its normal position reengages the pins 124 of the feed rake 122 with feed holes in the tape 121, and as the bell crank 129 subsequently pivots in a clockwise direction back to its normal position, the leaf spring 133 moving therewith operates the feed rake 122 to advance the tape. The leaf spring 133 and the spring 134 permit the feed rake 122 to be blocked although the bell crank 129 pivots sufficiently to move the feed rake 122 to the extremity of the rod 123. Following the operation of the feed rake 122, the cam 111 effects the return of the reset plate 114 to its normal position which in turn effects the return of the unblocked space and combination bars 76 and 77 respectively to their normal left hand positions. The reset plate 114 in moving to its normal left hand position also moves the blocked combination and space bars a slight amount to disengage the lugs 79 and 81 thereon from the side of the selected horizontal bar 68. Thereupon the spring 73 attached to the selected horizontal bar 68 elevates the same back into its normal position. Thus on each operation of the sleeve 26 the tape 121 is perforated in accordance with the received signal and advanced an amount corresponding to the number of perforations in the tape.

As well known in the telegraph art, a permutation type code employing five variable signaling impulses of either one or the other of two line conditions has thirty-two possible combinations or selections, and in order to increase the number of possible selections case shift signals are employed. While a code combination preceding a case shift signal may be identical with a code combination following a case shift signal, the operation of the receiving instrument in response to a signal preceding a case shift signal may be entirely different. In the Wheatstone-Morse cable signaling system case shift signals are not employed, as the desired number of combinations may be obtained by the proper sequence of the three-current signaling code. Accordingly, in the perforator the case shift control bar 47s, Fig. 4, is employed which is positioned into one or the other of its two positions in response to one or the other of two case shift signals to control the selection of the operating levers 61. With the case shift control selector bar 47s in one position, one of the operating bars 61 is selected in response to a signal code combination, while with the selector bar 47s in its other position, a different operating bar is selected in response to the same signal code group. The movement of the case shift control selector bar 47s from one position to the other is controlled by the case shift signals, and as case shift signals are not employed in the Wheatstone-Morse system no perforations preferably appear in the tape in response to the case shift signals. Accordingly, the clutch 27 is not released in response to case shift and certain other perforator function signals.

Let it be assumed that the case shift control selector bar 47s is in its left hand or letters position and that it is desired to condition the perforator to perforate figure representations in the tape. This conditioning of the perforator is performed in response to a so-called figures case shift shignal, and the figures case shift signal is such that it controls the operation of the selector bars 47 to permit the selection of the figure operating lever 61f, Fig. 13. The figure operating lever 61f is guided for movement by a pin 141 extending through a vertical slot 142 adjacent the center thereof. Fixed to the figure operating bar 61f is an upwardly extending arm 143 which has a leftwardly extending projection 144 at the upper end thereof in operative relation with the upper element of a normally open contact set indicated in general by reference numeral 146. The selection of the figures operating bar 61f by entering the row of aligned notches in the selector bars 47 effects the closing of the contact set 146 to apply ground at one of the terminals thereof over a conductor 147, Fig. 16, through the winding of a case shift selector bar reset magnet 148 to battery.

This causes energization of the magnet 148 and pivoting of the armature 149 associated therewith in a counter-clockwise direction. The armature 149 is pivoted on a pin 151 and a spring 152 normally holds the armature in its retracted position. The lower end of the armature lever 149 has a plate 153 thereon in operative relation with the left hand end of the case shift control selector bar 47s, and on energization of the magnet 148 the plate 153 engages the left hand end of the bar 47s to move the same from its left hand to its right hand position. As the bar 47s moves into its right hand position, the associated latch 41 latches the same thereat. Thus, in response to a figures shift signal combination the selector bar 47s is moved into its right hand position, as shown in Fig. 4, and in such a position only the operating bars 61 representing figures are selectable in response to associated signals. It will be noted that the figures operating bar 61f has no associated horizontal bar and does not trip the clutch 27, Fig. 1, on the selection thereof. Accordingly, no perforation in the tape will occur in response to a figures shift signal.

In response to a letter shift signal the letters shift operating bar 61s is selected which, like the bar 61f, is guided on the pin 141. The bar 61s has adjacent the center thereof an upwardly extending arm 147' with a leftwardly extending projection 148', which on selection of the lever 61s effects the closing of two normally open contact sets 149' and 151'. The closing of the contact set 149' effects an operation hereinafter described, while the closing of the contact set 151' applies ground over a conductor 152', Fig. 16, through the coil of the case shift trip magnet 34s to battery to cause energization of this magnet. The energization of the trip magnet 34s operates the latch 41, Fig. 4, associated with the case shift control selector bar 47s, whereupon the spring 51 associated with said selector bar moves the same from its right hand to its left hand position. With the selector bar 47s in its left hand position, it permits selection of the operating levers 61 which control the perforator to perforate the tape in accordance with signals representing letters. Thus, the case shift control selector bar 47s is moved from one of its positions to the other in response to the figures and letters case shift signals and remains in either one of its operated positions until the position of the same is changed in response to a case shift signal. A third operating bar 61b is guided by the pin 141 and is a so-called bell signal operating bar. The bar 61b has an upwardly extending L-shaped arm 153', which on each operation or selection of the bar 61b pivots a bell crank 154 which strikes and rings a bell 156. The purpose of the bell 156 is to enable an operator at a distant station to signal the attendant at the perforator. The bell 156 is operated once in response to each bell signal combination and by transmitting various numbers of bell signals the desired information may be transmitted. The operating bars 61b and 61s, similar to the operating bar 61f, have no associated horizontal bars such as 68 and do not trip the clutch 27. Accordingly, on receipt of signals causing a selection of these operating bars no perforating operations are performed.

Referring now to Fig. 16, a distributor mechanism indicated in general by reference numeral 157 is adapted to distribute signal controlling impulses to the perforator and time the operation of the same in accordance with received code groups. The distributor mechanism 157 comprises four rings 158, 159, 160 and 161 and a receiving relay 162 controlled by signals received over a line or cable L. The ring 160 of the distributor is connected by a conductor 163 to the tongue of the relay 162, and the relay operating in response to signals received over the line L applies potential to the ring 160 in accordance therewith. A brush 164 is adapted to bridge the rings 158 and 159, while a second brush 166 bridges the rings 160 and 161. The ring 161 has a set of five segments, numbered 1 to 5, which are individually connected by conductors 167 through the coils of the selecting magnets 34 to ground. Accordingly, as the brush 166 successively contacts the segments 1 to 5 of the ring 161 in timed relation with the received signals, operating impulses are supplied to the selecting magnets 34 in accordance with the received signals. The selective energization of the selecting magnets 34 effects the selective operation of associated selector bars 47, as pointed out above, or the selective movement of the selector bars 47 from their normal latched right hand positions into operated left hand positions.

As shown in Figs. 1, 2 and 3, a sixth pulse contact set operating lever 168 is pivotally mounted on a horizontal pivot rod 169. The lever 168 has a horizontally extending portion 171 at the lower end thereof in operative relation with a vertical surface 172 on each of the selector bars 47. The upper end of the lever 168 cooperates with a contact set 173 comprising a center tongue 174 and associated left and right hand stops. With all the selector bars 47 in their normal latched position, the tongue 174 of the contact set 173 contacts its left hand stop, as shown in Figs. 1 and 16. When any one of the selector bars 47 moves from its right hand to left hand position, the surface 172 thereon engages the section 171 of the lever 168 to pivot the same in a clockwise direction, as shown in Fig. 3, and the lever in turn moves the tongue 174 of the contact 173 out of engagement with its left hand stop and into engagement with its right hand stop. It will be noted that the case shift control selector bar 47s, Fig. 4, is cut away so that in either its left or right hand position it does not affect the lever 168.

When no signals are received over the line L, Fig. 16, the magnets 34 obviously are not operated. However, the receipt of a code combination operates one or more of the magnets 34, which in turn, through the instrumentality of the selector bars 47 and the sixth pulse cut-out member 168, move the tongue of the contact set 173 from its left to its right hand stop. The tongue 174 of the contact set 173 is connected by a conductor 176 to a segment 177 of the ring 159, and as the brush 164 bridges the segment 177 with the solid ring 158, which has potential applied thereto, the potential is applied to the tongue 174.

The left hand stop of the contact set 173 is connected by a conductor 178 to one of the terminals of a normally open key 179 while the right hand stop is connected by a conductor 181 through the coil of a sixth pulse relay 182 to ground. With the tongue 174 of the contact set 173 in contact with its right hand stop as moved by the sixth pulse contact operating member 168 at the time the brush 164 contacts segment 177, a circuit is completed from the solid ring 158 through the sixth pulse relay 182 to ground to operate the relay. The single tongue 183 of the relay 182 has potential applied thereto and in its unenergized position applies the potential over a conductor 184 through the winding of the operating solenoid 54 to ground to maintain the solenoid in an energized position with its associated plunger rod 53 in its left hand position. The make stop associated with the tongue 183 of relay 182 is connected by a conductor 186 to one of the terminals of a contact set 187. The contact set 187 is normally in a closed condition and the other terminal thereof is connected through a resistance 188 by a conductor 189 to the conductor 181.

The energization of the sixth pulse relay 182 removes the battery from its break stop and applies it to the make stop. This breaking of the circuit to the operating solenoid 54 allows the plunger rod 53 to move from its left to its right hand position and the application of battery to the make stop of the relay 182 establishes a locking circuit therefor from the tongue 183 to associated make stop, over conductor 186, through the closed contact set 187 and resistance 188, over the conductor 189 and through the coil relay 182 to ground.

Adjacent the left hand end of the plunger rod 53 is a pin 191 which is adapted to operate the contact set 187 and three other contact sets 192, 193 and 194. The contact set 192 is normally in an open condition while the contact sets 187, 193 and 194 are normally in a closed condition with the plunger rod in its left hand position. The opening of the circuit to the operating solenoid 54 allows the plunger 53 to move toward the right and during movement thereof in addition to operating the bail member 59, first allows the contact sets 193 and 194 to open and near the end of the rightward movement opens the contact set 187 and closes the contact set 192. The closing of the contact set 192 applies ground from one terminal thereof over a conductor 196 through the coil of a reset relay 197 to battery, causing the energization of the reset relay and the engagement of its tongue with its grounded make stop. The closing of the contact set 192 also applies ground to a conductor 198 and through a normally closed contact set 199 to one of the terminals of the contact set 194 and the tongue of the reset relay 197. The opening of the contact set 187 breaks the locking circuit to the relay 182 whereupon the associated tongue 183 returns to its break stop and reestablishes the circuit through the winding of the operating solenoid 54. The energization of the operating solenoid 54 moves the plunger rod from its right hand back into its normal left hand position and near the end of its leftward stroke the pin 191 recloses the contact sets 193 and 194. Closing of the contact set 193 does not ordinarily control any function, as it is a controlling function only for certain conditions of the perforator as hereinafter described. Closing of the contact set 194 applies ground from the make stop of the reset relay 197 through the contact set 194, over a conductor 201 and through a coil of a reset magnet 202 to battery, causing energization of the reset magnet. The energization of the reset magnet 202 in addition to resetting the selector bars 47 in the manner hereinafter described, effects the opening of the contact set 199 which interrupts the locking circuit to reset relay 197. When the locking circuit to the reset relay 197 is broken, the tongue thereof opens the circuit to the reset magnet 202 and the magnet returns to its normal condition.

The reset magnet 202 as shown in Fig. 3 is mounted on the upper side of a mounting plate 203 and has an armature 204 fixed to an armature lever 206. The armature lever 206 is pivoted at its upper end on a pin 207 and has a plate 208 at the lower end in operative relation with the left hand ends of the selector bars 47. The energization of the reset magnet 202 pivots the armature lever 206 in a counter-clockwise direction whereupon the plate 208 at the lower end thereof engages the left hand ends of all the selector bars 47 that happen to be in their left hand position and slides the same to the right into their right hand position where they are latched by associated latches 41. The armature lever 206 has an arm 209 attached thereto for operating the contact set 199. The operation of the solenoid plunger rod 53, the energization of the trip magnet 91 and the reset magnet 202 all occur in timed relation with respect to one another as timed by the above described circuits and prevents interference of the various operated elements. Thus in a normal cycle of operation of the perforator, the selector magnets 34 position the selector bars 47 following which the operating solenoid 54 controls the movement of the operating bars 61 into engagement with the selector bars to select a horizontal bar 68. The selection of a horizontal bar effects tripping of the clutch 27 to perforate the tape in accordance with the selected horizontal bar and the operating solenoid 54 returns the operating bars 61 to their normal position, which operation is followed by the energization of the reset magnet 202 to return the operated selector bars to their normal position where they are again capable of being selectively operated in accordance with the next received signal group.

In the transmission of the three-current Wheatstone-Morse type of signals, each character is composed of one or more positive and negative impulses in various combinations, with each combination separated from following combinations by a no-current interval. The no-current intervals are represented in the perforated tape by the presence of only a feed hole in the section separating the character-representing sections and are usually automatically perforated in conjunction with the perforation of each character. However, some of the less frequently transmitted characters, called combination characters, are represented in the perforated tape by perforations normally representing two or more characters without the feed holes separating the two or more characters. For example, the letter "a" perforated in the tape three times without the normal spacing between the "a" perforations represents a decimal point. In Fig. 14 the complete section 211, comprising three sub-sections 212 representing the letters "a" separated by blank sections 213 representing intervals of no-current, all together represent the letter "a" three times. In Fig. 15 the complete section 214 represents a decimal point and is formed by three sub-sections 215. The sub-sections 215 of Fig. 15 are identical with the sub-sections 212 of Fig. 14 which are separated by blank sections and accordingly the complete section 214 represents a decimal point. The manner in which the perforator is conditioned to omit the perforating of a blank section separating each character so as to form a combination character will now be described.

The receipt of a so-called combination signal effects the selection of a combination operating bar 61c, Fig. 6, and its associated horizontal bar 68c. The vertical arm of the combination horizontal bar 68c has a vertical slot 216 therein through which extends the rightwardly extending arm 217 of a bell crank 218. The bell crank 218 is pivotally mounted on a stud 219 and has an associated spring 221 which tends to pivot the same in a counterclockwise direction and normally holds the end of the arm 217 near the upper limits of the slot 216. The upper end of the arm 222 of the bell crank 218 has resiliently attached thereto by a spring 223 an L-shaped member 224, which may be called for identification the supplementary space stop. The supplementary space stop 224 has an upwardly extending arm 226, which is movable into and out of the path of movement of the feed rake 122, it being suitably guided for such movement in the tape feeding unit 130.

On the selection of the combination horizontal bar 68c, the bell crank 218 is pivoted in a clockwise direction and is latched in an operated position by the end of an arm 227 engaging a latching surface 228 associated with the arm 222 of the bell crank 218. The arm 227 is fixed to the left hand end of a rod 229 pivotally mounted in brackets 231 secured to the upper side of the mounting plate 203 and has a crank arm 233 at the right hand end thereof in cooperative relation with one of the elements of a contact set 234. With the bell crank 218 in its normal unlatched position, the lower element of the contact set 234 is separated from its upper element and tends to pivot the latching arm 227 and the rod 229 in a counter-clockwise direction, as viewed from the left hand end thereof. The movement of the latching arm 227 into latching engagement with the surface 228 permits the elements of the contact set 234 to close and control a circuit hereinafter described. Following the latching of the bell crank 218 in its operated position, the feed rake 122 moves out of the path of the arm 226 of the supplementary space stop, whereupon the spring 223 moves the latter into the path of the feed rake. Accordingly, the next forward movement of the feed rake will be reduced, as it comes into engagement with the arm 226 of the supplementary space stop, an amount equal to the distance between two feed holes in the tape. This reduction in the movement of the feed rake by an amount equal to the distance between two successive feed holes reduces the distance the tape is ordinarily advanced by a like amount, and accordingly each succeeding character perforated in the tape will not be separated by the usual feed hole.

The combination selector bar 61c is in the figures case group and, accordingly, is only selected for a particular code combination following a figures shift signal. This is called the "combination signal." Therefore, when it is desired to perforate a combination character comprising perforations representing two or more separate characters, a figures shift signal is transmitted, which is followed by the "combination signal" group. The individual characters which make up a composite combination character are in the letters case shift, and in order to select in the letters case shift group the perforator has to be conditioned to respond correctly to the letter signals. This conditioning of the perforator is performed automatically on the transmission and receipt of the combination character which, as hereinbefore described, in addition to selectively positioning the supplementary space stop 226 in an operated position, effects the closing of the contact set 234, Figs. 6 and 16. Ground is applied to one of the terminals of the contact set 234, and the closing thereof continues the ground over a conductor 236 to one of the terminals of the contact set 193. Accordingly, as the plunger rod 53 of the operating solenoid 54 nears the end of its return stroke after being operated in conjunction with the combination cycle of operation, it closes the contact set 193 to continue the ground over a conductor 237 and renders the case shift trip magnet 34s operative. The operation of the case shift trip magnet 34s effects the movement of the case shift control selector bar 47s to its left hand position, whereafter the perforator is operable to perforate the characters in the letters case group. Thus, the transmission of letter characters following the transmission of a figure shift and a combination signal causes whatever choice of letter characters that may be desired to be perforated in the tape without the usual space between the characters.

To return the perforator to the condition where it is operable to perforate the tape with spaces in between each perforation following the transmission of signals comprising a combination signal, a letters case shift signal is transmitted. The letters case shift signal, as pointed out above, effects the closing of the contact set 149' to apply ground over a conductor 238 through the coil of a combination magnet 239 to battery, causing the energization of the magnet 239. The armature 241 of the combination magnet 239, as shown in Fig. 6, is fixed to the rod 229, and the energization of the magnet lifts the trip arm 227 to allow the spring 221 attached to the bell crank 218 to pivot counter-clockwise back into its normal position. The pivoting of the bell crank 218 back into its normal position slides the supplementary space stop 224 to the left to move the end of the upwardly extending arm 226 thereof out of the path of the feed rake 122. This allows the rake to advance one center hole and thus puts a space after the last perforated character. On following operations of the feed rake 122, the tape will be advanced in the normal manner with spaces between each character. The pivoting of the rod 229 by the energization of the combination magnet 239 also operates the arm 233 to open the contact set 234 to remove the ground from one of the terminals of the contact set 193, Fig. 16.

It is desirous at times for the attendant at the perforator to be able to advance blank tape through the perforator without the necessity of having blank type advancing signals transmitted. This is accomplished by the attendant closing the key 179, Fig. 16, which completes a circuit from the left hand stop of the contact set 173 through the coil of a blank tape control solenoid 240 to ground. With the key 179 closed and the tongue 174 of the contact set 173 in contact with its left hand stop, as it will be when no signals are being received, a circuit is completed to the solenoid 240 each time the brush 164 contacts the segment 177. The solenoid 240, Fig. 8, has a plunger 242 which is connected to an arm 243 depending from the right hand end of a so-called blank tape horizontal bar 68a. The blank tape horizontal bar 68a has articulated thereto a vertical arm 244 for operating the horizontal bar 68a through the operating bar 61a in the same manner as the horizontal bars previously described are operated in response to associated signal combinations. Each time the solenoid 240 is energized the horizontal bar 68a is selected and pushes the arm 244 downward to engage the bail 82 and trip the clutch 27 to initiate a perforating operation. Thus, as long as the key 179 is held depressed and no signals are received over the line L, the horizontal bar 68a will be operated for each cycle of operation of the distributor 157. None of the lugs 81 on the combination bars 77 are cooperable with the horizontal bar 68a and, therefore, when this bar is selected, none of the combination bars 77 are blocked to perforate corresponding holes in the tape, whereas the selection of the horizontal bar 68a blocks the movement of all the space bars 76 so that the tape is advanced the maximum amount on the selection of this horizontal bar. The desirability of stepping out the blank tape occurs when the tape is being threaded through the punch block and, also, at times when the last character punched in the tape is to be run through an associated transmitter without the necessity of tearing the tape.

If, during the time that the switch 179 is closed, signals should be received, then the tongue 174 of contact set 173 is moved to the right hand stop and the normal perforation cycle will proceed without losing the signal, that is, the tape feed is automatically cut out.

It is obvious that various modifications of the invention other than the preferred embodiment herein described and shown in the accompanying drawings may be made without departing from the spirit or essential attributes thereof, and it is desired, therefore, that only such limitations be placed thereon as are imposed by the prior art or are specifically set forth in the appended claims.

What is claimed is:

1. In combination, a selector mechanism selectively operable in response to received permutation signals, a set of permutation bars selectively positioned in accordance with the operation of said selector mechanism, a plurality of control bars, means including said permutation bars for selectively operating said control bars, a perforating mechanism including a set of selectively operable perforating pins, a storage tape, a tape advancing mechanism, a first means controlled by said control bars for selectively controlling the operating of said perforating pins, and a second means controlled by said control bars independently of said last mentioned means for controlling said tape advancing mechanism to advance said tape variable amounts on various operations thereof.

2. In combination, a selector mechanism selectively operable in response to received permutation signals, a set of permutation bars selectively positioned in accordance with the operation of said selector mechanism, a plurality of control bars, means including said permutation bars for selectively operating said control bars, a perforating mechanism including a set of selectively operable perforating pins, a storage tape, a tape advancing mechanism, a first means controlled by said control bars for selectively controlling the operating of said perforating pins, a second means controlled by said control bars independently of said last mentioned means for controlling said tape advancing mechanism to advance said tape variable amounts on various operations thereof, and means including said first and second means whereby said tape is advanced by said tape advancing mechanism an amount corresponding to the number of perforating pins selectively operated.

3. In combination, a cyclically operable perforating mechanism for forming code perforations in a storage tape to represent stored characters by the location and number of said perforations, said perforator normally operative in each cycle to separate each character representing code perforation or group of perforations by a blank non-coded transverse section in said tape, a selectively cyclically operable signal responsive device, means including said signal responsive device for selectively controlling the operation of said perforating mechanism, and means controlled by a predetermined selective cycle of operation of said signal responsive device for conditioning said perforating mechanism whereby on following cycles of operation thereof said tape is perforated without the normal non-coded blank transverse sections between successive character representing perforations.

4. In combination, a cyclically operable perforating mechanism for forming code perforations in a storage tape to represent stored characters by the location and number of said perforations, said perforator normally operative in each cycle to separate each character representing code perforation or group of perforations by a blank non-coded transverse section in said tape, a cyclically operable permutation selecting mechanism including a group of permutation bars set in various combinations of one or the other of two positions in accordance with received signals, a plurality of individual elements selectively operable one at a time controlled by said permutation bars, means for controlling said perforating mechanism by said elements, and means operative on the selection of a predetermined one of said elements for controlling said perforating mechanism to perforate said tape during following cycles of operation without the normal non-coded blank transverse sections separating each character representing code perforation.

5. In combination, a cyclically operable perforating mechanism for forming code perforations in a storage tape to represent stored characters by the location and number of said perforations, said perforator normally operative in each cycle to separate each character representing code perforation or group of perforations by a blank non-coded transverse section in said tape, a cyclically operable permutation selecting mechanism including a group of permutation bars set in various combinations of one or the other of two positions in accordance with received signals, a plurality of individual elements selectively controlled by said permutation bars, means for controlling said perforating mechanism by said elements, means operative on the selection of a predetermined one of said elements for controlling said perforating mechanism to perforate said tape during following cycles of operation thereof without the normal non-coded blank transverse sections separating each character representing code perforation, and means for controlling said perforating mechanism whereby no perforation is formed in said tape on the selection of the predetermined one of said elements.

6. In combination, a cyclically operable perforating mechanism for forming character representing code perforations in a storage tape, the various character representations being distinguished from one another by the number and positions of said perforations, a tape advancing mechanism, said mechanism normally operative concomitantly with said perforating mechanism to advance said tape a predetermined amount greater than the number of transverse sections perforated by said perforating mechanism on associated operations of said perforating mechanism, a cyclically operable permutation type of signal control mechanism for selectively controlling the operation of said perforating and tape advancing mechanisms in accordance with received signals, said control mechanism normally operative to initiate the operation of said perforating and tape advancing mechanisms for one cycle of operation at a time in conjunction with each cycle of operation of said control mechanism, means operative on a predetermined cycle of operation of said control mechanism for controlling said tape advancing mechanism to advance said tape only the amount perforated by said perforating mechanism in conjunction with subsequent cycles of operation of said perforating mechanism, and a second means operative on said predetermined cycle of operation of said control means for preventing cycles of operation of said perforating and tape advancing mechanisms in conjunction with the predetermined cycle of operation of said control means.

7. In combination, a cyclically operable perforating mechanism for forming character representing code perforations in a storage tape, the various character representations being distinguished from one another by the number and positions of said perforations, a tape advancing mechanism, said mechanism normally operative concomitantly with said perforating mechanism to advance said tape a predetermined amount greater than the number of transverse sections perforated by said perforating mechanism on associated operations of said perforating mechanism, a cyclically operable permutation type of signal control mechanism for selectively controlling the operation of said perforating and tape advancing mechanisms in accordance with received signals, said control mechanism normally operative to initiate the operation of said perforating and tape advancing mechanisms for one cycle of operation at a time in conjunction with each cycle of operation of said control mechanism, means operative on a first predetermined cycle of operation of said control mechanism for controlling said tape advancing mechanism to advance said tape only the amount perforated by said perforating mechanism in conjunction with subsequent cycles of operation of said perforating mechanism, and means operative on a second predetermined cycle of operation of said control means for returning said tape advancing mechanism to a normal condition wherein said tape is advanced said predetermined amount greater than the number of transverse sections perforated by said perforating mechanism on following cycles of operation of said control means.

8. In combination, a cyclically operable perforating mechanism for forming code perforations in a tape in accordance with cable or Wheatstone-Morse character representing type of signals wherein the characters are of various lengths and the lengths of tape perforated correspond to the lengths of the character signals, a source of permutation type character signals containing shift and unshift case group signals wherein each character signal is composed of a definite number of signaling intervals in permutations, a signal responsive device selectively responsive to said permutation type of signals including a set of normally latched permutation members, means for unlatching said permutation members in accordance with received permutation signal groups, a first set of elements cooperable with said permutation members, said elements being selectable one at a time in accordance with the latched and unlatched positions of said permutation members, a second set of elements for controlling said perforating mechanism associatable with and selected one at a time by said first set of elements, means operative during the operation of a selected one of said second elements and during the control of said perforating mechanism thereby for returning the selected of said first selected elements to normal position and means operative after the return of the selected one of said first elements to normal position for returning the unlatched of said permutation members to normal latched position during the operation of said perforating mechanism as controlled by the selected one of said selected elements.

9. In combination, a cyclically operable perforating mechanism for forming code perforations in a tape in accordance with cable or Wheatstone-Morse character representing type of signals wherein the characters are of various lengths and the lengths of tape perforated correspond to the lengths of the character signals, a source of permutation type character signals containing shift and unshift case group signals wherein each character signal is composed of a definite number of signaling intervals in permutations, a signal responsive device selectively responsive to said permutation type of signals including a set of normally latched permutation members, means for unlatching said permutation members in accordance with received permutation signal groups, a first set of elements cooperable with said permutation members, said elements being selectable one at a time in accordance with the latched and unlatched positions of said permutation members, a second set of elements for controlling said perforating mechanism individually associatable with said first elements, said second elements being positively moved to a selected position by associated first elements and to a normal position by resilient means, means for operating the perforating mechanism in accordance with the selected one of said second elements and during the operation thereof to lock the selected of said second elements in selected position, means operative after such locking of said second selected element for returning the selected first element and the unlatched of said permutation members to normal positions whereupon said permutation members are resettable in accordance with the receipt of a subsequent character signal during the operation of said perforating mechanism as controlled by the selected one of said second elements and means including said resilient means for returning the selected of said second elements to normal position following the control of said perforating mechanism thereby.

10. In a telegraph signal storage device, a perforating mechanism, a storage tape, a source of permutation type code signal groups, a permutation selector selectively controlled by said permutation code signal groups, means including said permutation selector as controlled by said permutation signals for controlling the operation of said perforating mechanism to perforate said storage tape to store signals therein in accordance with a second type of code signal groups differing from said permutation type of code signal groups and means for controlling said perforating mechanism whereby a plurality of said code signal groups are represented by a single code signal group of said second type of signals in said storage tape.

11. In a telegraph signal storage device, a storage tape, a perforating mechanism adapted to form perforations in said tape to represent a first type of code signal groups, a permutation selector selectively controlled by a second type of code signal groups, said second type of signals being code groups of permutation signals, means normally operative by said permutation selector for controlling said perforating mechanism to perforate said tape to store signals of said first type therein to represent according to a predetermined arrangement corresponding code groups of said second type of signals and means for controlling said perforating mechanism to perforate said tape to represent by a single code group perforation therein a plurality of code groups of said second type of signal code groups.

12. In a telegraph signal storage device, a storage tape, a perforating mechanism adapted to form perforations in said tape to represent a first type of code signals, a permutation cyclically operable selector selectively controlled by a second type of code signals, said second type of signals being code groups of permutation signals, means normally operative by said permutation selector for controlling said perforating mechanism to perforate said tape to store signals of said first type therein to represent according to a predetermined arrangement corresponding code groups of said second type of signals, means for operating said perforating mechanism to normally form representative group perforations in said tape only on the receipt of predetermined code groups of said second type on said selector mechanism whereby said stored signals represent only predetermined of the received permutation signals and means for operating said perforating mechanism to represent by a single group perforation a plurality of normal perforating cycles of operation of said permutation selector.

HAKON H. HAGLUND.
ALBERT W. DICKEY.
THOMAS A. NEWMAN.